(12) United States Patent
Cruz

(10) Patent No.: US 7,833,594 B2
(45) Date of Patent: *Nov. 16, 2010

(54) POLYMER BASED SAUSAGE CASING

(75) Inventor: Ruben Garcia Cruz, Jalisco (MX)

(73) Assignee: Casematic, S.A. DE C.V. (MX)

( * ) Notice: Subject to any disclaimer, the term of this patent is extended or adjusted under 35 U.S.C. 154(b) by 0 days.

This patent is subject to a terminal disclaimer.

(21) Appl. No.: 10/356,837

(22) Filed: Feb. 3, 2003

(65) Prior Publication Data

US 2004/0062888 A1  Apr. 1, 2004

Related U.S. Application Data

(63) Continuation-in-part of application No. 10/255,727, filed on Sep. 26, 2002, now abandoned.

(51) Int. Cl.
*A22C 13/00* (2006.01)
(52) U.S. Cl. .................... 428/34.8; 426/135
(58) Field of Classification Search ............... 428/34.8; 426/105, 125, 129–130, 135, 138, 140; 206/802; 138/118.1, 145
See application file for complete search history.

(56) References Cited

U.S. PATENT DOCUMENTS

| | | | | |
|---|---|---|---|---|
| 2,000,835 A | * | 5/1935 | Goldberger | 426/105 |
| 2,424,346 A | | 7/1947 | Wilcoxon | 17/1 |
| 2,514,660 A | | 7/1950 | McClure et al. | 17/1 |
| 2,686,927 A | | 8/1954 | Grey | 17/1 |
| 2,757,409 A | | 8/1956 | Parkes et al. | 17/1 |
| 2,984,574 A | | 5/1961 | Matecki | 99/176 |
| 3,312,995 A | | 4/1967 | Garey | 17/1 |
| 3,451,827 A | | 6/1969 | Bridgeford | 99/176 |
| 3,454,981 A | | 7/1969 | Martinek | 17/42 |
| 3,456,044 A | * | 7/1969 | Pahlke | 264/567 |
| 3,461,484 A | | 8/1969 | Arnold | 17/49 |
| 3,487,499 A | | 1/1970 | Klyce | 17/1 |
| 3,608,973 A | | 9/1971 | Klyee | 302/2 |
| 3,909,424 A | * | 9/1975 | Clark | 508/121 |
| 3,950,469 A | | 4/1976 | Gneuss et al. | 264/95 |
| 3,961,086 A | | 6/1976 | Turbak | 426/240 |
| 3,988,804 A | | 11/1976 | Regner et al. | 17/45 |
| 4,129,546 A | | 12/1978 | Axelrod et al. | 260/31.8 T |
| 4,131,137 A | | 12/1978 | Lustig et al. | 138/118.1 |
| 4,217,430 A | | 8/1980 | Starkweather et al. | 525/183 |
| 4,233,341 A | | 11/1980 | Hammer et al. | 427/230 |
| 4,243,074 A | | 1/1981 | Strutzel et al. | 138/118.1 |
| 4,248,912 A | | 2/1981 | Gerigk et al. | 427/230 |
| 4,250,398 A | * | 2/1981 | Ellis et al. | 219/549 |
| 4,276,340 A | | 6/1981 | De Leiris | 428/166 |
| 4,287,217 A | | 9/1981 | Hammer et al. | 426/105 |
| 4,303,711 A | | 12/1981 | Erk et al. | 428/36 |
| 4,353,939 A | | 10/1982 | Becker et al. | 427/238 |
| 4,374,871 A | | 2/1983 | Steinbis | 427/236 |
| 4,391,302 A | | 7/1983 | Huhn et al. | 138/118.1 |
| 4,396,039 A | | 8/1983 | Klenk et al. | 138/118.1 |
| 4,399,839 A | | 8/1983 | Hutschenreuter et al. | 138/118.1 |
| 4,442,868 A | | 4/1984 | Smith et al. | 138/118.1 |
| 4,446,167 A | | 5/1984 | Smith et al. | 426/650 |
| 4,463,778 A | | 8/1984 | Judd et al. | 138/118.1 |
| 4,525,984 A | | 7/1985 | Kollross | 53/483 |
| 4,547,932 A | | 10/1985 | Romeike et al. | 17/45 |
| 4,560,520 A | | 12/1985 | Erk et al. | 264/22 |
| 4,580,316 A | | 4/1986 | Günter | 17/33 |
| 4,606,922 A | | 8/1986 | Schirmer | 426/412 |
| 4,640,852 A | | 2/1987 | Ossian | 428/35 |
| 4,659,599 A | | 4/1987 | Strutzel | 428/36 |
| 4,764,406 A | | 8/1988 | Hisazumi et al. | 428/35 |
| 4,773,127 A | | 9/1988 | Stall | 17/45 |

(Continued)

FOREIGN PATENT DOCUMENTS

CA   2431692   *  6/2002

(Continued)

OTHER PUBLICATIONS

English Abstract, Baleat et al., FR 2710820A1, Apr. 14, 1995.*

(Continued)

*Primary Examiner*—Sophie Hon
(74) *Attorney, Agent, or Firm*—Howrey LLP

(57) ABSTRACT

A polymer-based sausage casing suitable for use with uncooked meats such as chorizo is disclosed. A polymer resin is blended with a silicon-based barrier control agent, preferably a polyhedral oligomeric silsesquioxane, to increase the permeability of the sausage casing. The resultant blend can be biaxially stretch-oriented to produce a single-layered polymer-based sausage casing suitable for use with uncooked sausage meats such as chorizo, and specifically suitable for the gas and moisture permeability needed during the curing process for uncooked sausage meats. Such polymer-based casings can also be employed for cooked sausages by choosing a silicon-based barrier control agent that increases gas and moisture barrier, thereby increasing shelf-life for unpeeled sausages. A method for improving the peelability of cooked sausage casings by injecting a thin coating of a releasing agent, without the addition of a surfactant, into the sausage casing during the shirring process is also disclosed. The releasing agent is a hydroxypropyl methylcellulose solution that creates a low viscosity releasing agent that effectively improves peelability from any type of sausage casing, but preferably for use with the polymer-based sausage casing of the present invention.

22 Claims, No Drawings

U.S. PATENT DOCUMENTS

| | | | |
|---|---|---|---|
| 4,818,551 A | 4/1989 | Stall et al. | 426/420 |
| 4,897,274 A | 1/1990 | Candida et al. | 426/127 |
| 4,897,295 A | 1/1990 | Erk et al. | 428/34.8 |
| 4,944,970 A | 7/1990 | Stenger et al. | 428/34.8 |
| 5,037,683 A | 8/1991 | Schirmer | 428/36.7 |
| 5,185,189 A | 2/1993 | Stenger et al. | 428/34.8 |
| 5,238,353 A | 8/1993 | Kollross et al. | 414/746.4 |
| 5,252,375 A | 10/1993 | Turbak et al. | 428/96 |
| 5,326,613 A | 7/1994 | Stenger | 428/34.8 |
| 5,356,331 A | 10/1994 | Madrigal-Ocegueda | 452/32 |
| 5,356,676 A | 10/1994 | Von Widdern et al. | 428/34.8 |
| 5,382,190 A | 1/1995 | Graves | 452/21 |
| 5,399,427 A | 3/1995 | Stenger et al. | 428/34.8 |
| 5,425,974 A | 6/1995 | Von Widdern et al. | 428/354 |
| 5,443,780 A | 8/1995 | Matsumoto et al. | 264/290.2 |
| 5,480,690 A | 1/1996 | Stenger et al. | 428/34.8 |
| 5,484,867 A | 1/1996 | Lichtenhan et al. | 528/9 |
| H1592 H | 9/1996 | Nicholson | 428/34.8 |
| 5,612,104 A | 3/1997 | Grund | 428/348 |
| 5,691,043 A * | 11/1997 | Keller et al. | 428/212 |
| 5,747,124 A | 5/1998 | Pophusen et al. | 428/34.8 |
| 5,773,035 A | 6/1998 | Stall et al. | 425/67 |
| 5,773,059 A | 6/1998 | Delius et al. | 426/129 |
| 5,776,398 A | 7/1998 | Stall et al. | 264/188 |
| 5,782,683 A | 7/1998 | Stall | 452/27 |
| 5,798,430 A | 8/1998 | Michalczyk et al. | 528/42 |
| 5,865,312 A | 2/1999 | Stall | 206/443 |
| 5,897,432 A | 4/1999 | Stall | 452/21 |
| 5,914,141 A | 6/1999 | Stall et al. | 426/105 |
| 5,952,450 A | 9/1999 | Ishihara et al. | 528/196 |
| 5,955,126 A | 9/1999 | Jon et al. | 426/105 |
| H1816 H | 11/1999 | Babrowicz | |
| 6,086,929 A | 7/2000 | Stall | 426/92 |
| 6,143,813 A * | 11/2000 | Sezume et al. | 524/127 |
| 6,235,825 B1 | 5/2001 | Yoshida et al. | 524/314 |
| 6,362,279 B2 | 3/2002 | Lichtenhan et al. | 525/105 |
| 6,409,018 B1 | 6/2002 | Manzano | 206/443 |
| 6,569,932 B2 * | 5/2003 | Hsiao et al. | 524/269 |
| 6,576,329 B2 * | 6/2003 | Kong | 428/213 |
| 6,589,615 B1 * | 7/2003 | Yen | 428/34.8 |
| 6,767,930 B1 * | 7/2004 | Svejda et al. | 521/134 |
| 2001/0018486 A1 | 8/2001 | Lichtenhan et al. | 524/588 |
| 2002/0052434 A1 * | 5/2002 | Lichtenhan et al. | 524/261 |

FOREIGN PATENT DOCUMENTS

| | | |
|---|---|---|
| EP | 0962145 | 12/1999 |
| ES | 8600872 | 2/1986 |
| JP | 59-91860 | 5/1984 |
| JP | 8-023870 | 1/1996 |
| JP | 8-238053 | 9/1996 |
| JP | 2000-334881 | 12/2000 |
| WO | WO 02/50144 | 6/2002 |

OTHER PUBLICATIONS

Hybrid Plastics—POSS Catalog, 5.01 rev. (Sep. 2002).
International Search Report mailed Feb. 18, 2004 in International Patent Application No. PCT/MX03/00070.
Japanese Office Action dated Oct. 15, 2008, for JP Application No. 2005-501960.
Columbia Office Action dated Feb. 27, 2009, for CO Application No. 05026465.

* cited by examiner

POLYMER BASED SAUSAGE CASING

RELATED APPLICATIONS

This application is a continuation-in-part of U.S. patent application Ser. No. 10/255,727 entitled "Polyamide-Based Sausage Casing" filed on Sep. 26, 2002, now abandoned which is hereby incorporated by reference in its entirety.

BACKGROUND OF THE INVENTION

The present invention is related to a polymer-based casing suitable for encasing cooked and uncooked sausage meats.

Artificial polymeric sausage casings must fulfill numerous requirements if they are, to be suitable for commercial use. These requirements differ depending on the type of meats that are to be encased. For example, cooked meats, such as traditional sausages purchased from a grocery store, wieners, hams, salamis, and liver pates are inserted into a casing in an uncooked, paste-like form, and are then cooked or smoked in the casing. Depending on the particular market, this cooked meat product may be sold with or without the casing, and are oftentimes stored refrigerated below 4° C. Some of the requirements for these types of cooked meats are as follows:

1. Shirrability—The film must have the ability to be shirred and stay shirred until the filling process.
2. Recovery Power—The film must continue to cling without creasing when the previously heated packaged meat cools or loses weight due to evaporation of water.
3. Strength—The film must ensure that the high filling pressure mainly produces an elastic deformation of the tubular film, without localized bulging.
4. Peelability—The film must be easily removable from the packaged meat without damaging the meat product.
5. Temperature resistance—The film must be able to tolerate temperatures associated with the cooking process.
6. Barrier properties—The film must have good barrier properties against permeation of oxygen and water vapor.

On the other hand, chorizo is a type of uncooked, ground fresh meat that is often mixed with vinegar and spices, and is stored at ambient temperatures such as 20-25° C. Unlike the cooked meats discussed above, chorizo and other similar products have a fermentation or curing process after production where moisture and $CO_2$ gas are produced by the meat. Fermented meats and sausages are characterized by their tangy flavor and in most cases chewy texture. The characteristic tang results from bacterial fermentation during which lactic acid and other byproducts of fermentation accumulate. The pH of fermented sausages typically ranges from about 4.6 to about 5.3. Fermented sausages include both dry and semi-dry varieties. Representative fermented, dry sausages include Genoa salami, hard salami, and pepperoni. Representative fermented, semi-dry sausages include summer sausage, farmer sausage, and chorizo. The moisture and gas created during the curing process must be able to permeate through the casing film to avoid breaking or puncturing, and to avoid unwanted bacterial growth and acidity that would otherwise develop and damage the quality and taste of the meat.

Chorizo and other similar uncooked products are encased primarily with cellulosic casings, but are also produced using collagen casings or natural pork tripe. Tubular cellulosic casings are well known in the art of meat casings, and have been widely used for many years by numerous manufacturers for both cooked and uncooked meats. The basic process for manufacturing regenerated cellulosic casings is through the well-known viscose process, whereby a liquefied colloidal dispersion of cellulose fibers is created in an alkaline liquid carrier.

Once the cellulosic casing is formed, it is typically shirred according to well known methods wherein long tubular lengths, often called "strands" are compacted and pleated to provide shorter, coherent tubes, often called "shirred sticks" or "sticks." High-speed shirring machines are common in the art, such as those disclosed in U.S. Pat. Nos. 2,984,574, 3,451,827, 3,454,981, 3,461,484, 3,988,804, and 4,818,551, which are incorporated by reference herein. The coherency of the shirred stick is important in order that it remain straight and rigid. Small diameter shirred food casings must be packaged for distribution and sale, and this packaging is critical to commercial performance since the casing has a thickness of from about 20 microns to about 40 microns, and is therefore prone to damage. Although the sticks must be rigid to prevent deformation and survive transportation to the foodstuff manufacturer, the sticks must also be easily dispensed without waste when being filled with meat paste using high speed filling machines.

Although the standard for chorizo production, cellulosic casings have several drawbacks. The most commercially important drawback is that cellulosic casings are too permeable to moisture. This allows loss of saleable product weight or sometimes the opposite problem—moisture can be absorbed into the cellulosic casing thereby allowing fungus to grow inside the casing. Also, when printed with more than two colors, ink tends to permeate through a cellulosic casing, thereby contacting and staining the product.

Another synthetic alternative for chorizo casings exists with biaxially stretch-oriented polyamide films. Polyamide, commonly called nylon, is a semi-crystalline thermoplastic that is composed of linear aliphatic segments that are connected by amide linkages. Polyamide can be produced either by the polymerization of a lactam and an amino acid or a dibasic acid and a diamine. The wide variety of routes by which polyamide can be produced make it possible to tailor the backbone to meet specific needs. The various types of polyamide are identified by number designations, which represent the number of carbon atoms in each of the starting materials. For example, nylon 6,6 is made from the 6-carbon hexamethylenediamine and a 6-carbon adipic acid. All nylons absorb moisture from the atmosphere, and the water that enters their structure causes dimensional changes and acts as a plasticizer. These factors must be taken into account when designing a product constructed of polyamide. Additionally, biaxial orientation—stretching the film in one direction and then at right angles—can be used to orient the crystals and make the film stronger. Polyamide is also inexpensive and has excellent tensile strength as compared to other polymers, which are reasons for its widespread use as a fiber. Unfilled polyamide is biologically inert, and most grades have been cleared for food contact use by the U.S. Food and Drug Administration.

In general, single-layer polyamide sausage casings are capable of easy integration into the shirring and filling operations that presently exist for cellulosic sausage casings. Although cheaper to manufacture than cellulosic casings, pure polyamide casings have several shortcomings as compared to traditional cellulosic casing technology, as applied to both cooked and uncooked sausage meats. For example, pure polyamide casings cannot be smoked, cannot be effectively peeled either manually or automatically, and do not allow gas to permeate for uncooked sausages that undergo fermentation.

For cooked meats, several layers of polyamides and other polymers are often used in order to compensate for certain disadvantageous properties of pure polyamide. For example, a number of different types of cooked meats and sausages require casing materials that exhibit low permeability to water vapor. The barrier against water vapor prevents weight loss due to evaporation of water from the contents, which reduces the saleable value of the product. This also ensures that the sausage casing surrounds the meat in a tight, crease-free manner, even after relatively long periods of storage without formation of hollow spaces between the inner wall of the casing and the sausage meat where jelly pockets can form. For this purpose, it is known to combine a polyamide layer with a second layer of a different polymer whose permeability to water vapor is lower than that of the polyamide layer. There are, however, certain types of meats where even the reduced permeability of this two-layer composite casing is too high to be suitable for use. For example, certain cooked meats severely discolor when exposed to even the slightest amount of oxygen. The prior art has resolved this problem by providing additional polymeric layers to the casing that provides superior oxygen barrier. As a result of these multiple layers, several other commercially important qualities are often sacrificed, such as the transparency of the casing, the printability of the casing, and consistency and operability during the shirring and filling processes. Accordingly, it is desirous to provide a new single-layered polymer-based casing that meets all of the above requirements for packaging cooked meats and sausages.

For uncooked meats, polyamide casings provide a different problem. As discussed above, chorizo and other uncooked products that require a curing/fermentation process (such as soft cheeses) require a casing that is permeable to the gases and moisture that are produced. Pure polyamide casings have inherently too high a barrier to gases and moisture for this particular application. As an alternative, several polyamide casing producers have attempted to blend polyamides with other polymers such as polyester, polypropylene, and Surlyn® to provide a permeable film. The problem with this approach is that the shirred stick that results from such films can be too rigid, and have problems with unshirring prior to usage. For these and other reasons, polyamide casings are not used today in the chorizo and uncooked sausage meat industry. For uncooked meats, what is needed is a single-layered polymer-based casing that can be tailored to meet both product permeability requirements as well as the commercial processing requirements for shirring and filling.

SUMMARY OF THE INVENTION

To that end, the present invention provides a method for producing a casing suitable for use in cooked or uncooked sausage, where the casing has suitable barrier properties for the specific type of food product to be encased. A polymer resin is blended with a silicon-based barrier control agent, preferably a polyhedral oligomeric silsesquioxane, at a specific concentration to create a master blend. This master blend may then be further blended or co-extruded with additional pure polymer, and then biaxially stretch-oriented, to produce the polymer-based casing. The type of silicon-based barrier control agent used can be varied to provide a resultant film that either increases or decreases the barrier properties of the film relative to the pure polymer. The amount of additional pure polymer blended or co-extruded with the master blend can be varied to affect the extent of the increased or decreased permeability of the resultant film.

In another embodiment, the present invention provides a single-layered polymer-based sausage casing suitable for use with uncooked meats such as chorizo. A polymer resin is blended with a silicon-based barrier control agent, preferably a polyhedral oligomeric silsesquioxane, to increase the permeability of the sausage casing, where the polyhedral oligomeric silsesquioxane concentration of the blend is in the range of from about 0.2% to about 20% by weight. The resultant blend can be biaxially stretch-oriented to produce a single-layered polymer-based sausage casing suitable for use with uncooked sausage meats such as chorizo, and specifically suitable for the gas and moisture permeability needed during the curing process for uncooked sausage meats.

In yet another embodiment, the present invention provides a method for improving the peelability of cooked meat casings by injecting a thin coating of a releasing agent, without the addition of a surfactant, into the casing during the shirring process. Preferably, the releasing agent is a hydroxypropyl methylcellulose solution with a concentration of from about 1% to about 20% by weight, thereby creating a low viscosity releasing agent with a viscosity in the range from about 2 cp to about 100 cp. This embodiment of the present is intended for use with any type of casing, but preferably for use with the polymer-based casings of the present invention.

DETAILED DESCRIPTION OF THE INVENTION

The present invention provides a method for producing a polymer-based sausage casing, where the film has suitable barrier properties for the specific type of sausage meat to be encased. The present invention also provides compositions for polymer-based films suitable for use in sausage casings.

In a preferred embodiment, a polyamide resin is blended with a silicon-based barrier control agent at a specified silicon-based barrier control agent concentration to create a master blend. This master blend may then be blended or co-extruded with pure polyamide, and then biaxially stretch-oriented, to produce a polyamide-based film. The type of silicon-based barrier control agent used can be varied to provide a film with increased or decreased barrier properties relative to pure polyamide. The amount of pure polyamide blended or co-extruded with the master blend can also be varied to control the permeability of the polyamide-based film. Polyamides, as intended by the present invention, include all polyamides as discussed previously, but preferably relates to linear aliphatic polyamides. Most preferably, the linear aliphatic polyamide used in the films of the present invention is selected from the group consisting of nylon 6, nylon 6/6, nylon 12, or any combination or copolymer thereof.

Silicon-based barrier control agents, as intended by the present invention, include molecules containing at least one silicon atom, and are further defined by four basic features. First, the silicon-based barrier control agent used in the present invention must be of a single type of molecule and not a randomly assorted assembly of molecules. However, it is intended that the silicon-based barrier control agent may include an ascertainable blend of molecules, provided that each type of molecule meets the requirements herein described. Second, the silicon-based barrier control agents used in the present invention must have a polyhedral geometry with well-defined three-dimensional shapes, i.e. a cage. Clusters are good examples while planar hydrocarbons, dendrimers, and particulates are not. Third, the silicon-based barrier control agents used in the present invention must have nanoscopic sizes that range from about 0.5 nm to about 7 nm. Fourth, the silicon-based barrier control agents used in the present invention must have systematic chemistries that enable precise control over its size, stereochemistry, reactivity, and physical properties, as well as those they impart to other chemical systems, such a polymer systems.

In a preferred embodiment of the present invention, the silicon based molecule used is a polyhedral oligomeric silsesquioxane. More preferably, the polyhedral oligomeric silsesquioxane has the following structure:

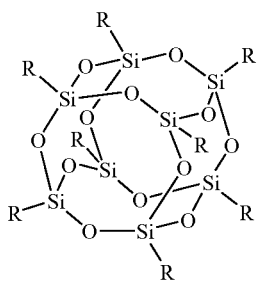

wherein the groups are independently selectable from organic compounds having 1-30 carbon atoms. It is a preferred aspect of the present invention that the R groups are independently selectable from the group consisting of phenyl, i-octyl, cyclohexyl, cyclopentyl, i-butyl, methyl, triflouropropyl, and phenethyl. It is most preferred that the R group is i-butyl, which provides a molecule that can be expressed as octaisobutyl-polyhedral oligomeric silsesquioxane.

Polyhedral oligomeric silsesquioxanes meet the four requirements outlined above for silicon-based barrier control agents, and provide more advantages as applied to the present invention. Polyhedral oligomeric silsesquioxanes as defined above possess a Si—O cage-like core surrounded by non-reactive organic groups. This permits the inorganic core to be compatible with an organic matrix, such as the polymer systems described herein. This compatibility allows the polyhedral oligomeric silsesquioxanes described above to be compounded into polymers yielding true nanocomposites with complete molecular level dispersion. It is this unique ability to be dispersed at the molecular level that provides the significant enhancement of the barrier and permeability properties of polymers. Such polyhedral oligomeric silsesquioxanes are marketed, for example, by Hybrid Plastics Corporation, which specializes in Nanostructured™ chemical technology including POSS® Molecular Silicas™.

It has been determined that the polymer-based film in conjunction with a silicon-based barrier control agent in accordance with the present invention can be used to control the barrier properties of the film. For example, it is a preferred aspect of the present invention that the silicon-based barrier control agent concentration in the mixture is in the range of from about 0.1% to about 20% by weight, more preferably in the range of from about 0.1% to about 5% by weight, and most preferably in the range of from about 0.2 to about 1% by weight. Another aspect of the present invention is a method for controlling the concentration of the silicon-based barrier control agent in the polymer-based film by blending a known quantity of pure polymer resin into a master blend of polymer and silicon-based barrier control agent of a known concentration. For example, a master blend of 20% by weight silicon-based barrier control agent in polyamide can be coextruded or otherwise blended with pure polyamide to produce a film that has a concentration less than 20% by weight.

Although the disclosure to this point has focused on a preferred embodiment of the present invention utilizing polyamide resin, the present invention includes other types of polymer-based casings as well. Polymers that are capable of being oriented, such as polyester, polyvinyl chloride, polyethylene, polypropylene, and any combinations or copolymers thereof, in conjunction with silicon-based barrier control agents in accordance with the present invention, provide properties suitable for encasing foodstuffs such as meats and cheeses. Accordingly, a wide range of polymers share the benefits of the present invention and are usable in conjunction with silicon-based barrier control agents to produce casings for use with foodstuffs such as cooked sausage, uncooked sausage, and cheese.

The polymer-based casings of the present invention can be biaxially stretch-oriented to produce a single-layered polymer-based sausage casing suitable for use with uncooked sausage meats such as chorizo. Up until this invention, cellulosic casings have been exclusively used for uncooked sausage meats because cellulosic casings allow the moisture and gases produced during the curing process to permeate the casing. However, cellulosic casings often provide too little barrier to such permeation, thereby limiting the "shelf-life" of such uncooked products because they dry out too quickly. Single-layered polymer-based casings according to the present invention provide the permeability of cellulosic casings, but also provide a means for controlling the gas and moisture permeability associated with the curing process in order to tailor the permeability for specific products and customer needs. Longer shelf-lives can be obtained by either choosing a silicon-based barrier control agent that provides less permeability (i.e. greater barrier), or by effectively reducing the concentration of the silicon-based barrier control agent in the polyamide-based film, thereby reducing the permeability. This embodiment of the present invention discloses for the first time a low cost, single-layered sausage casing that provides the greatest amount of barrier flexibility for foodstuff industry needs.

It is also intended that the polymer-based films of the present invention can also be used in the packaging of soft cheeses. It is well known in the art that soft cheeses may be packages in cellulose film packaging material because of its superior permeability properties, as is illustrated by U.S. Pat. No. 4,276,340, which is incorporated by reference herein. Soft cheeses such as Camembert and Brie are packaged before the cheese is fully ripened. The ripening process continues after packaging by a dynamic bacterial fermentation process during which time the cheese absorbs oxygen from the atmosphere and releases carbon dioxide, thus requiring a packaging film that provides sufficient gas permeability. Because soft cheeses are characterized as having a high moisture content, it is also essential that the packaging material by permeable to the passage of water vapor contained within the cheese product, yet not so permeable as to dry out the cheese. The polymer-based casing of the present invention is a perfect fit for such applications because of the exact control over the gas and moisture barrier properties of the casing, as was described above for the application with uncooked meats such as chorizo.

In yet another embodiment of the present invention, the polymer-based sausage casings of the present invention can be used with sausage meat that is to be cooked or smoked in the casing, and wherein the casing adequately prohibits moisture and gases from permeating the casing. With cooked sausages, such as hot dog sausages or wieners, market considerations dictate the gas barrier that is necessary for a commercially viable product. For example, prepeeled hot dog sausages do not require high gas barrier for two reasons. First, the prepeeled hot dog sausage will be peeled in high speed peeling machines soon after cooking, thereby eliminating the need for protection from oxygen permeation through the casing. Second, for prepeeled hot dog sausages that are smoked rather than cooked, it is desirous to have a higher gas permeability so that the smoke can permeate the casing. However, in unpeeled hot dog sausage markets, such as in Mexico, it is important to be able to control the gas permeability to optimize the shelf-life of the product. The polymer-based sausage casings of the present invention provide the commercial flexibility needed for each type of product. Longer shelf-lives for unpeeled hot dog casings can be obtained by either choosing a silicon-based barrier control agent that provides less permeability (i.e. greater barrier), or by effectively reducing the concentration of the silicon-based barrier control agent in the polymer-based film, thereby reducing the permeability. A similar analysis can be made for other types of cooked sausages. Silicon-based barrier control agents can be carefully chosen to either increase or decrease the gas and moisture permeability relative to either cellulose or pure polyamide-based casings. The concentration of the silicon-based barrier control agent can be carefully chosen to provide the optimal amount of permeability for a given product requirement. This embodiment of the present invention discloses for the first time a low cost, single-layered sausage casing that provides the greatest amount of barrier flexibility for cooked sausage industry needs.

It has also been determined that polymer-based films containing a silicon-based barrier control agent as described above can be effectively used to produce a small-diameter sausage casing with a film thickness in the range of from about 6 microns to about 80 microns, and more preferably in the range of from about 20 microns to about 30 microns. Such casings produced according to; the present invention adequately provide the recovery power, strength, and temperature resistance that are required for a commercially acceptable sausage product. In fact, a film thickness in the range of 10-20 microns according to the present invention represents a significant reduction in film thickness as compared to the present state of the art cellulosic and plastic sausage casings, which typically average about 28 microns. This reduction in film thickness will allow casing manufacturers to produce a shirred stick that contains more casings per stick, thereby reducing operating costs for both the casing manufacturer as well as the downstream sausage producer. This manufacturing advantage coupled with the low costs of polymer casings versus cellulosic casings, and the flexible control of barrier properties makes the present invention an attractive alternative to the present state of the art technologies.

Yet another embodiment of the present invention is the concurrent use of a releasing agent with the polymer-based casings herein described to provide commercially acceptable peelability characteristics for sausages that are marketed prepeeled. Prepeeled sausages, such as hot dogs or wieners that are vacuum packed in downstream operations, are typically peeled using high-speed automatic peeling machines, such as those disclosed in U.S. Pat. Nos. 2,424,346, 2,514,660, 2,686, 927, 2,757,409, 3,312,995, 3,487,499, and 3,608,973, which are incorporated by reference herein. Such machines require minimal resistance to the separation of casing from the cooked sausage meat, otherwise the product will jam at the machine or go through the machine unpeeled, which increases operating expense. Sausages and hot dogs that are sold unpeeled from their original casing must also be easy to peel for the consumer.

Traditionally, polyamide casings, as compared to cellulosic casings, have been less popular in the sausage industry for their poorer peelability characteristics as well as their poorer gas permeability properties. A preferred aspect of the present invention involves coating the inside wall of the casing with a releasing agent that will improve the peelability of the casing. The prior art resolves the issue of peelability using releasing agents containing cellulose material in conjunction with a surfactant that provides the even distribution of the coating composition on the casing surface. It is an embodiment of the present invention to provide a cellulose releasing agent that will coat the inside wall of any type of food product casing using a releasing agent that does not contain a surfactant. More specifically, a low viscosity pharmaceutical grade of hydroxypropyl methylcellulose is the preferred releasing agent for use with casings, and preferably for use with the polmer-based casings of the present invention. Pharmaceutical grade hydroxypropyl methylcellulose comes as a white powder that is diluted with water or another solvent to produce a low viscosity solution. One commercially available pharmaceutical grade hydroxypropyl methylcellulose is Demacol 2910 HE, which is marketed by Demacsa.

It is a preferred aspect of the present invention to dilute the releasing agent with a solvent in a ratio from about 1% to about 20%, and more preferably in a ratio from about 3.5% to about 8%. A viscosity in the range of from about 2 to about 100 cp, and preferably from about 5 to about 6 cp, can be achieved with pharmaceutical grade hydroxypropyl methylcellulose diluted as described above. It is in part this low viscosity that provides adequate coating of the inside wall of sausage casings without the use of surfactant.

It is also a preferred aspect of the present invention to apply the releasing agent during the shirring process, without the use of a surfactant, to evenly coat the inside of the casing in the shirred stick. The equipment for adding a liquid during the shirring process is common in the art for cellulosic casings, as is illustrated by U.S. Pat. Nos. 4,374,871 and 4,818,551, which are incorporated herein by reference. The amount of coating applied to the casing will typically be in the range of from about 0.5 mg/in$^2$ to about 50 mg/in$^2$, and more preferably in the range of from about 3.5 mg/in$^2$ to about 10 mg/in$^2$. It has been determined that this coating of releasing agent as described by the present invention provides a shirred stick that is commercially viable, that is, it is sufficiently rigid for transportation to sausage manufacturers and provides sufficient resistance to premature unshirring and breakage during the filling process.

The addition of liquid flavorings and colorants to the releasing agent are generally well known in the art in order to provide a different taste and color to the meat sausage. With the addition of liquid colorants and flavorings, the thin coating of releasing agent inside the shirred casing-serves to transfer colorant or flavoring to the encased sausage meat, and specifically to the surface of the encased sausage meat. The use of liquid flavorings and colorants have been determined to work especially well with the low viscosity releasing agents of the present invention as described herein.

The printing of words, numbers, and graphics onto cellulosic sausage casings is well known in the art. In general, traditional printing on cellulosic casings cannot exceed two colors because of the tendency for the ink to permeate through the casing, thereby contacting and staining the food. With the single-layered polyamide-based sausage casings of the present invention, the casing is an excellent surface for printing up to ten colors without any ink permeating through the casing. From a commercial standpoint, in markets where either cooked or uncooked meats are sold unpeeled, access to several colors and detailed graphics avoids the use of stickers or outer packages to differentiate the product and increase the product's appearance and appeal.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A food casing encasing an uncooked food product having a fermentation or curing process after production, the food casing comprising a film comprising a mixture of:
   (a) polyamide; and
   (b) polyhedral oligomeric silsesquioxane monomer having the structure:

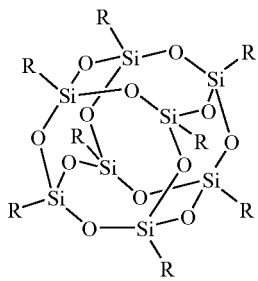

wherein R is a non-reactive organic group selected from the group consisting of phenyl, i-octyl, cyclohexyl, cyclopentyl, i-butyl, methyl, trifluoropropyl, and phenethyl; and
   wherein the polyhedral oligomeric silsesquioxane monomer permits moisture and gas created during fermentation or curing of the uncooked food product to permeate the food casing at a permeation greater than if no polyhedral oligomeric silsesquioxane monomer were present.

2. The food casing of claim 1, wherein the polyhedral oligomeric silsesquioxane monomer has a particle size ranging from about 0.5 nm to about 7 nm.

3. The food casing of claim 1, wherein the film is shined in a machine to form shirred sticks.

4. The food casing of claim 1, wherein the film is biaxially stretch-oriented.

5. The food casing of claim 1, wherein R is i-butyl.

6. The food casing of claim 1, wherein the polyhedral oligomeric silsesquioxane monomer is octaisobutyl-polyhedral oligomeric silsesquioxane.

7. The food casing of claim 1, wherein the uncooked food product is a soft cheese that is not fully ripened.

8. The food casing of claim 1, wherein the uncooked food product is a dry sausage selected from the group consisting of genoa salami, hard salami, and pepperoni.

9. The food casing of claim 1, wherein the uncooked food product is a semi-dry sausage selected from the group consisting of summer sausage, farmer sausage, and chorizo.

10. The food casing of claim 1, wherein the polyhedral oligomeric silsesquioxane monomer in the food casing is in the range of from about 0.1% to about 20.0% by weight.

11. The food casing of claim 1, wherein the polyhedral oligomeric silsesquioxane monomer in the food casing is in the range of from about 0.1% to about 5.0% by weight.

12. The food casing of claim 1, wherein the polyhedral oligomeric silsesquioxane monomer in the casing is in the range of from about 0.2% to about 1.0% by weight.

13. The food casing of claim 1, wherein the food casing has a film thickness in the range of from about 6 microns to about 80 microns.

14. The food casing of claim 1, wherein the food casing has a film thickness in the range of from about 20 microns to about 30 microns.

15. The food casing of claim 1, wherein the food casing further comprises a releasing agent coated on the inside wall of the casing.

16. The food casing of claim 15, wherein the releasing agent comprises hydroxypropyl methylcellulose and water.

17. The food casing of claim 16, wherein the hydroxypropyl methylcellulose concentration in the releasing agent is in the range of from about 1% by weight to about 20% by weight.

18. The food casing of claim 16, wherein the hydroxypropyl methylcellulose concentration in the releasing agent is in the range of from about 3.5% by weight to about 8% by weight.

19. The food casing of claim 15, wherein the releasing agent has a viscosity in the range of from about 2 cp to about 100 cp.

20. The food casing of claim 15, wherein the releasing agent has a viscosity in the range of from about 5 cp to about 6 cp.

21. The food casing of claim 15, wherein the releasing agent further comprises liquid flavoring.

22. The food casing of claim 15, wherein the releasing agent further comprises liquid coloring.

* * * * *

UNITED STATES PATENT AND TRADEMARK OFFICE
CERTIFICATE OF CORRECTION

PATENT NO. : 7,833,594 B2
APPLICATION NO. : 10/356837
DATED : November 16, 2010
INVENTOR(S) : Cruz It is certified that error appears in the above-identified patent and that said Letters Patent is hereby corrected as shown below:

Column 9, Line 47: change "shinned" to --shirred--

Signed and Sealed this
Twenty-second Day of March, 2011

David J. Kappos
*Director of the United States Patent and Trademark Office*